United States Patent
Burlak et al.

(10) Patent No.: US 7,463,139 B2
(45) Date of Patent: Dec. 9, 2008

(54) METHOD AND SYSTEM FOR DRIVING A VEHICLE TRAILER TOW CONNECTOR

(75) Inventors: Gary Joseph Burlak, Lake Orion, MI (US); Marian Mirowski, West Bloomfield, MI (US)

(73) Assignee: STMicroelectronics, Inc., Carrollton, TX (US)

( * ) Notice: Subject to any disclaimer, the term of this patent is extended or adjusted under 35 U.S.C. 154(b) by 637 days.

(21) Appl. No.: 10/967,389

(22) Filed: Oct. 18, 2004

(65) Prior Publication Data
US 2006/0085099 A1 Apr. 20, 2006

(51) Int. Cl.
*B60D 1/36* (2006.01)
*B60D 1/62* (2006.01)

(52) U.S. Cl. .................. 340/468; 340/431; 340/471; 280/456.1; 280/423.1; 701/29; 701/34; 701/36; 307/10.1; 307/10.8; 307/9.1

(58) Field of Classification Search ........... 340/428, 340/10.8, 9.1; 280/427, 456.1; 303/124
See application file for complete search history.

(56) References Cited

U.S. PATENT DOCUMENTS

| | | | |
|---|---|---|---|
| 5,030,938 A | | 7/1991 | Bondzeit |
| 5,157,376 A | | 10/1992 | Dietz et al. |
| 5,397,924 A | * | 3/1995 | Gee et al. .................. 307/9.1 |
| 5,611,695 A | | 3/1997 | Bentley |
| 5,775,712 A | * | 7/1998 | Link et al. ................ 280/422 |
| 5,920,128 A | * | 7/1999 | Hines ........................ 307/10.8 |
| 5,945,743 A | * | 8/1999 | Pattantyus et al. ......... 307/10.1 |
| 5,959,365 A | * | 9/1999 | Mantini et al. ............. 307/10.1 |
| 6,115,831 A | * | 9/2000 | Hanf et al. .................... 714/43 |
| 6,130,487 A | * | 10/2000 | Bertalan et al. ............. 307/9.1 |
| 6,259,170 B1 | * | 7/2001 | Limoge et al. ............. 307/10.8 |
| 6,545,600 B1 | | 4/2003 | Boner |

(Continued)

FOREIGN PATENT DOCUMENTS

DE  3936638 C1 * 3/1991

(Continued)

OTHER PUBLICATIONS

James B. Brown; Using DeviceNet in the Trailer Industry; 4th Internatioanl CAN Conference; 1997; 9pgs; Motorola Semiconductor; Germany.

(Continued)

*Primary Examiner*—Thomas G. Black
*Assistant Examiner*—Lin B Olsen
(74) *Attorney, Agent, or Firm*—Lisa K. Jorgenson; Andre M. Szuwalski

(57) ABSTRACT

In a method for driving electronic devices connected to a vehicle trailer tow connector a trailer electronic device control signal is receiving from a vehicle data communication network. In response to the received control signal, a solid state power control device is switched to connect electrical power to a selected pin of the trailer tow connector. The trailer electronic device control signal may be received from a wiring harness connector connected to a vehicle data communication network. A vehicle trailer tow connector module includes a module housing. A vehicle wiring connector and a trailer wiring connector are coupled to the module housing. A power control circuit is connected to a selected pin in the trailer wiring connector. A controller circuit is coupled to the vehicle wiring connector for receiving communication data from a vehicle data bus, and coupled by control lines to the power control circuit.

3 Claims, 3 Drawing Sheets

U.S. PATENT DOCUMENTS

| | | | |
|---|---|---|---|
| 6,642,628 B2 | 11/2003 | Burdick et al. | |
| 7,363,127 B2* | 4/2008 | Fogelstrom | 701/29 |
| 2001/0040455 A1* | 11/2001 | Arlt et al. | 324/504 |
| 2002/0030403 A1* | 3/2002 | Lesesky et al. | 303/122.02 |
| 2003/0195668 A1* | 10/2003 | Radtke et al. | 701/1 |
| 2003/0200017 A1* | 10/2003 | Capps et al. | 701/36 |
| 2004/0119517 A1* | 6/2004 | Pauletti et al. | 327/198 |
| 2004/0189092 A1 | 9/2004 | Burlak et al. | |
| 2005/0253456 A1* | 11/2005 | Spilker | 307/10.1 |

OTHER PUBLICATIONS

Development, Evauation, & Demonstration . . . ; NHTSA; Jan. 1998; NTIS; Springfield, VA; www.nhtsa.dot.gov/people/perfor/its/TruckMus/htm.

* cited by examiner

METHOD AND SYSTEM FOR DRIVING A VEHICLE TRAILER TOW CONNECTOR

BACKGROUND OF THE INVENTION

1. Field of the Invention

The present invention relates generally to methods and systems for driving lights or other electrical devices connected to a vehicle trailer tow connector, and more specifically to methods and systems for communicating using a vehicle data communication network, and in response to network communication signals, providing electrical and mechanical connections to power lights or other electrical devices on a trailer connected to a vehicle trailer tow connector.

2. Description of the Prior Art

Motor vehicles that are designed to tow trailers frequently include a trailer tow connector near a trailer hitch or point where the trailer is connected to the towing vehicle. The trailer tow connector typically includes a plurality of connector pins or electrical connection points where power is provided from the towing vehicle to the trailer in order to power electrical devices on the trailer. Such electrical devices may include running lights, such as brake lights, parking lights, and turn signals. Other electrical devices may include back-up lights, audible back-up alerts, interior lights for lighting the inside of a trailer, cooling or ventilation fans, or other similar electrical devices. Selected pins in the trailer tow connector are usually connected to an electrical device or light that serves a particular purpose. For example, there is usually a pin for operating the brake lights on the trailer, and another pin for operating a right-hand turn signal, and yet another pin for the left-hand turn signal. Many trailer tow connectors include a pin that normally remains powered for operating devices that may be turned on and off by the user of the trailer. For example, this battery power pin may be connected to an interior dome light inside the trailer, which may be switched on and off by a person while they are working inside the trailer.

In the prior art, a common trailer tow connector has two back-to-back connectors mounted on either end of a housing, such as the arrangement shown in FIG. 1. As illustrated, trailer tow connector 20 includes connector 22 on one end of housing 24, and connector 26 on the other end. Connector 22 connects to the electrical wiring harness of the towing vehicle, while connector 26, which may be referred to as a "car end socket," receives a trailer connector or "trailer end plug" on the trailer. Trailer tow connector 20 may include cover 28 that covers connector 26 when a trailer connector is not plugged in. Cover 28 may be pivotally mounted to mounting plate 30, which may be mounted flush against a bumper or other or plate or mounting bracket located near the trailer hitch or towing point. Housing 24 is typically cylindrical so that it passes through a punched hole in the surface to which trailer tow connector 20 is mounted.

Inside of housing 24 of prior art trailer tow connector 20 are wires that connect one pin in connector 22 directly to another pin in connector 26. Trailer tow connector 20 merely provides a transition or an adaptor between the vehicle electrical harness that is connected to connector 22 and connector 26, which is securely mounted and protected when it is not in use. Connector 26 may be a more robust connector, designed to be more frequently connected and disconnected with the wiring harness of a trailer. Cover 28 is a convenient way of protecting the connection pins in connector 26 from moisture, dirt, or mechanical abuse caused by an object striking the pins. Housing 24 provides the structure for mechanically supporting connector 22, while also protecting the wires and their connections from dirt, moisture, and other elements.

In modern vehicles, software-controlled electronics play a major role in the functioning of a vehicle's subsystems. For example, there may be eight to ten intelligent electronic modules performing functions such as controlling the engine transmission, brakes, steering, navigation, HVAC, safety, security, audio, driver information, and other similar functions. Though each function may be able to work independently, the modules may be enhanced by being connected and able to share information using an in-vehicle data communication network. Examples of such networks include Society Of Automotive Engineers (SAE) J1850, Controller Area Network (CAN), and KWP2000. These communication protocols may be used for automobile inter-module communication.

The physical communication bus of the vehicle data network may be implemented with a simple, two-wire differential serial bus system that can operate in noisy electrical-magnetic environments.

Forced by the increasing number of distributed control systems in cars and the increasing wiring costs of car body electronics, the availability of a powerful and reliable serial data communication system for the exchange of messages between the different control units is becoming important to remaining competitive in the automotive market.

Another data communication network used in vehicles is the Local Interconnect Network (LIN). LIN is used for communications and networking with a serial bus running between intelligent sensors and actuators. The LIN specification covers the data transmission protocol (the physical layer and the data link layer), and the transmission medium. The LIN bus is a class A protocol operating at a bus speed of 19,200 baud over a maximum cable length of 40 meters. LIN protocol was designed to communicate changes in switch settings and respond switch changes so that it communicates events that happen in "human" time (hundreds of milliseconds). LIN protocol supports bidirectional communication on a single wire, while using inexpensive microcontrollers. The protocol uses an autobaud step on every message. Transfer rates of up to 20 Kbaud are supported, along with a low power Sleep Mode, where the bus is shut down to prevent draining the battery, but can be powered up by any node on the bus.

When using a prior art trailer tow connector, many problems can arise that may cause hazardous or unsafe driving conditions. For example, a light on a trailer may burn out or become disconnected, which may cause a driving hazard at night or in foggy conditions. In another situation, the trailer may include electrically assisted brakes, which may fail or become disconnected, resulting in increased stopping distance that may pose a driving hazard. Many of these driving hazards arise without notification to the driver. When the driver does not know that a hazardous condition exists, the driver can not adjust driving techniques or immediately stop to fix of the failed component.

It should be apparent to those persons skilled in the art that a need exists for an improved trailer tow connector that may detect and prevent electrical problems that create driving hazards, or that may immediately alert a driver of a potentially hazardous condition in the electrical system of a trailer towed by a motor vehicle.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which.

DESCRIPTION OF THE PREFERRED EMBODIMENTS

Figure 1:
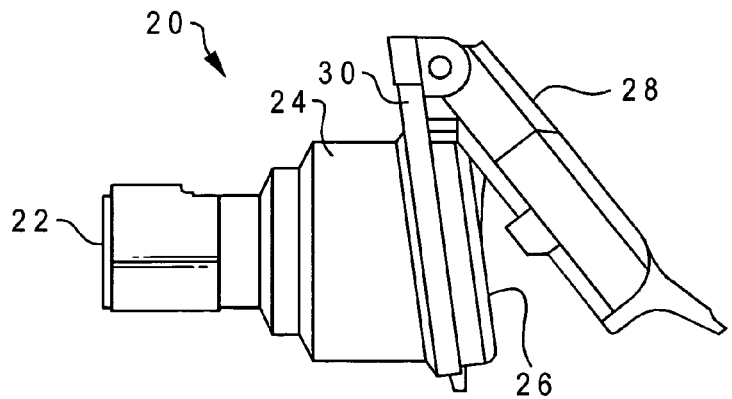
FIG. 1 is a perspective view of a trailer tow connector assembly, which is know in the prior art.
Figure 2:
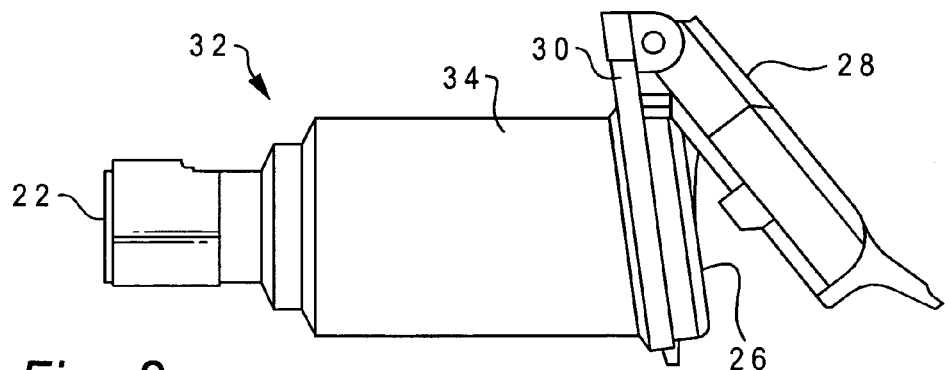
FIG. 2 is a perspective view of a trailer tow connector module in accordance with the method and apparatus of the present invention.

With reference now to the drawings, and in particular with reference to FIG. 2, there is depicted a trailer tow connector module in accordance with the method and apparatus of the present invention. As illustrated, trailer tow connector module 32 has many of the components of trailer tow connector assembly 20, including connector 22, connector 26, cover 28, and mounting plate 30. According to the present invention, housing 34 is structured and arranged to accommodate, house, and protect electronics for communicating with a vehicle data network, and for switching, measuring, and managing power applied to pins of connector 26 for operating electronic devices on a towed trailer. In the embodiment shown in FIG. 2, housing 34 has been elongated to provide an interior volume for housing electronic circuits. By using an elongated housing 34, trailer tow connector module 32 may be mounted through a hole in a bumper or mounting plate, similar to the mounting of trailer tow connector assembly 20 in the prior art.

Note that housing 34 may be made of metal or plastic or other similar material that protects and supports electronic circuits inside the housing. Housing 34 provides a weatherproof and dirt proof seal from the back of connector 22 to the back of connector 26 or mounting plate 30.

Figure 3:
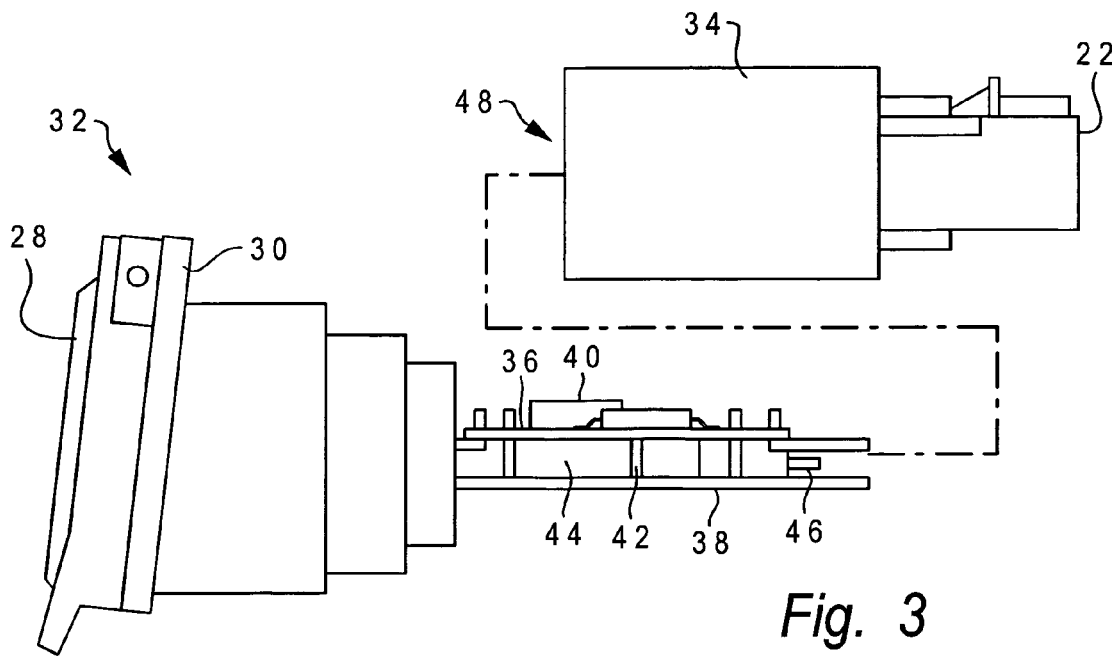
FIG. 3 is an elevation view of a partially disassembled trailer tow connector module in accordance with the method and apparatus of the present invention.

FIG. 3 shows a partially disassembled trailer tow connector module 32, wherein housing 34 and connector 22 have been removed from connector 26 and mounting plate 30. In the embodiment illustrated in FIG. 3, housing 34 protects and supports two circuit boards 36, 38. Circuit board 36 may include power control devices 40, which are solid-state switching devices used to connect power to selected pins of connector 26.

Circuit board 38, which may be connected to circuit board 36 with conductors 42, and may include logic circuits 44, which process control signals, measurement signals, and data communication signals. Pins 46 may be received by pin sockets on the back of connector 22 (indicated by reference numeral 48) within housing 34. Therefore, circuit boards 36 and 38 may be stacked and connected with conductors 42 and housing 34 may be coupled near the back side of mounting plate 30 so that pins 46 make electrical connection to selected pins in connector 22.

In an alternative embodiment, circuit boards 36 and 38 may be circular and stacked perpendicular to a central axis of cylindrical housing 34.

While in a preferred embodiment housing 34 is sealed to the mounting plate 30 by ultrasonic welding, other sealing processes such as gluing, may be used.

Connector 22 is a standard connector used in the automotive industry for connecting one portion of a wiring harness to another. For example, connector 22 may be implemented with a connector part number PA66-MD40, manufactured and sold by Pollak company in El Paso, Tex. Similarly, connector 26 may be implemented with a standard trailer tow connector having either four or seven pins. A four pin connector may be implemented with a connector, manufactured and sold by Pollak. A thirteen pin connector for European applications may be implemented with a DIN ISO 11446 style connector readily available from several manufacturers.

Figure 4:
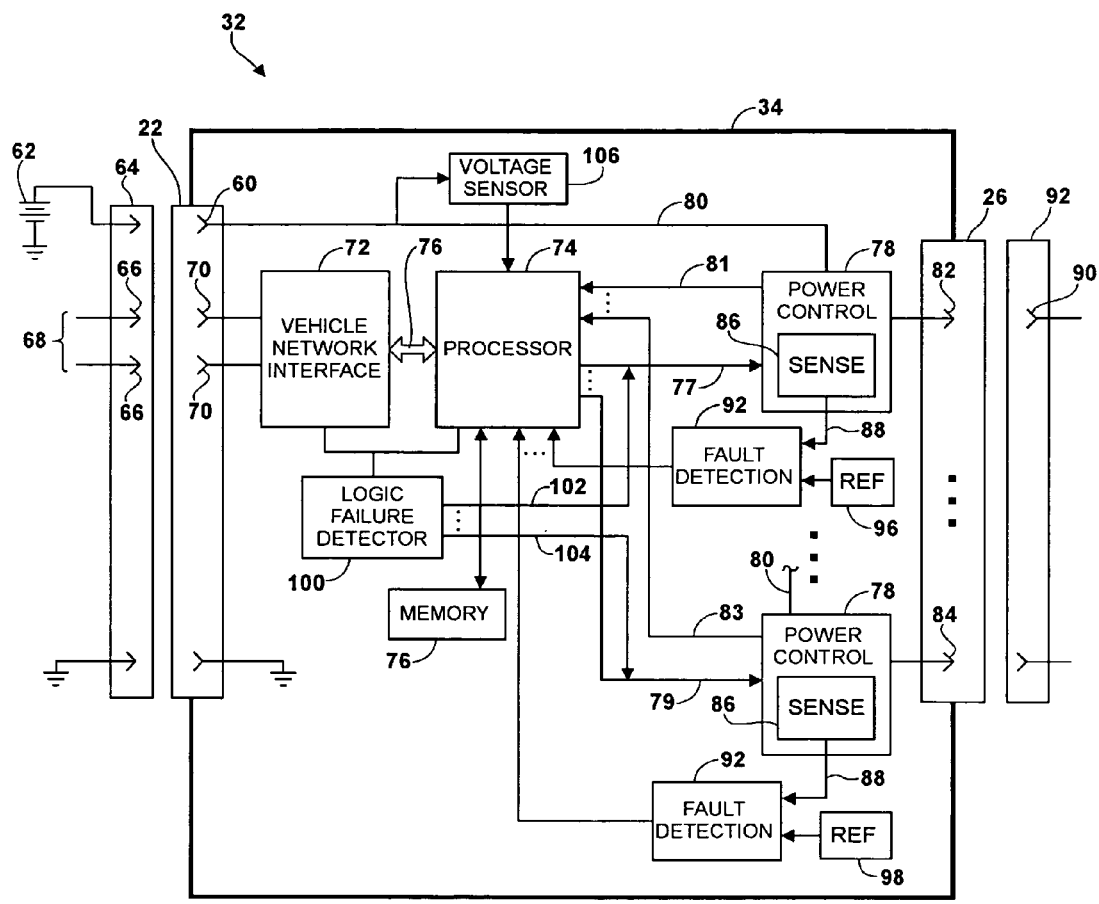
FIG. 4 is a high-level schematic block diagram of the trailer tow connector module of the method and apparatus of the present invention.

Referring now to FIG. 4, there is depicted a high-level schematic representation of the functional blocks of the method and apparatus of the present invention. As illustrated, trailer tow connector module 32 includes housing 34 coupled to vehicle wiring connector 22 and trailer wiring harness connector 26. Connector 22 includes a pin 60 for receiving power from vehicle battery 62 via wiring harness connector 64. Vehicle battery 62 is typically a 12 volt rechargeable wet cell, but it may be implemented with other types of batteries having different voltages. Pin 60 receives a supply of power that will be managed, controlled, switched, and measured within trailer tow connector module 32.

Wiring harness connector 64 also includes pins 66 that are connected to the vehicle data communication bus 68. Data communication bus 68 may be implemented with any one of several known automotive data buses, of which two of the most common data buses include the controller-area network (CAN), which is more specifically defined by International Standards Organization [ISO] 11898 and ISO 11159, and the Local Interconnect Network [LIN], which is based on the transport protocol defined in ISO 15765-2. Thus, data communication bus 68 may be implemented with any electrical, mechanical, and protocol specification that is robust and fast enough to control lights and other electronic devices on a towed trailer while insuring the safety and reliability for the user. Note that some protocols are preferred because of their simplicity, and hence their economic implementation.

Pins 70 in connector 22 connect to pins 66, thereby coupling data communication bus signals 68 to vehicle network interface 72. The purpose of vehicle network interface 72 is to implement the physical layer and data link layer of the ISO (International Organization for Standardization)/OSI [Open System Interconnection] reference model of data communication. Vehicle network interface 72 is able to receive data from the network, transmit data via the network, properly handle the formatting of data, handle error detection or correction, and determine the presence and health of the data communication bus 68. In a preferred embodiment, vehicle network interface 72 is implemented with integrated circuit part number L9638, manufactured and sold by STMicroelectronics, which is based in Geneva, Switzerland.

Vehicle network interface 72 is coupled to processor 74 via data bus 76. In a preferred embodiment, processor 74 may be implemented with integrated circuit part number ST72F561, which is sold by STMicroelectronics based in Geneva, Switzerland. Note that in some embodiments the function of vehicle network interface 72 may be incorporated within processor 74, wherein both functions reside in a single integrated circuit package.

Processor 74 provides the logical intelligence to execute the steps or change from state-to-state to perform the functions according to the method of the present invention. Processor 74 is preferably coupled to memory 76, which stores values, variable data, and instructions for the operation of processor 74. Memory 76 maybe separate from processor 74, or may be incorporated within the integrated circuit that implements processor 74. In a preferred embodiment, at least a portion of memory 76 is programmable, either during the manufacture of trailer tow connector module 32, or during the particular installation or applications of trailer tow connector module 32. The programming of memory 76 allows trailer tow connector module 32 to be used on many different vehicles in several application. For example, smaller vehicles may tow smaller trailers that use few lights or require less current to drive the lights compared to larger vehicles that are capable of pulling larger trailers with different electrical loads. Thus, data stored in memory 76 may accommodate the control and management of different amounts of electrical power for electronic devices on different trailer types or different trailer sizes. Additionally, different vehicle manufactures may use memory 76 to program trailer tow connector module 32 for their particular standards or applications.

Processor 74 is coupled by control lines 77 and 79 to one or more power control devices 78. Power control devices 78 are solid-state switches that are able to connect power bus 80 to pins 82 and 84 in connector 26 in response to signals on control lines 77 and 79. Power control devices 78 are preferably able to communicate their off or on status, or other status conditions, back to processor 74 via status lines 81 and 83. Power control devices 78 are preferably implemented with integrated circuit part number VND5004A and VND5012A, manufactured and sold by STMicroelectronics. Power control devices 78 preferably have a low on resistance, in the range of 4 to 25 milliohms.

In addition to the power switching function, power control devices 78 preferably include circuits for measuring and protecting the power control device. For example, current sensor 86 is used to measure the current passing through the electronic switch within power control device 78 and provide current sense signal 88 as an output. Power control device 78 may also include thermal protection which measures the temperature of the electronic switch and protects the device by opening the switch when a temperature threshold has been exceeded. The power output from power control device 78 is coupled to pin 82, which is thereafter coupled to pin 90 on connector 92, which is part of the wiring harness on the trailer that provides power to electronic devices on the trailer, such as trailer lights.

Fault detection circuits 92 receive current sense signal 88 and reference signals 96 and 98. Reference signals 96 or 98 may be the same value, or different values, wherein the values are set based upon the desired current ranges for power passing through pins 82 and 84, respectively. Therefore, different current ranges may be set for a different light, or set of lights. For example, the design may require a higher current for operating brake lights as compared to a lower current for operating clearance lights or marker lights.

The purpose of fault detection circuit 92 is to determine whether or not the current passing through power control device 78 falls within a predetermined range of acceptable current values. Fault detection circuits 92 are in communication with processor 74 so that processor 74 may perform safety or electrical protection related functions in the event that currents fall outside of the predetermined selected ranges. Note that the function of fault detection circuit 92 may also be incorporated within processor 74, but it is shown here separately to more clearly disclose the invention. When the function is incorporated within processor 74, processor 74 typically includes A-to-D converters that can receive and process the analog current sense signal 88.

Logic failure detector 100 is coupled to processor 74 and vehicle network interface 72 in order to detect a condition wherein the processor has failed or communication with the data communication bus 68 has failed, or other similar conditions which would render trailer tow connector module 32 inoperable, possibly causing a hazardous driving condition. Logic failure detector 100 is preferably implemented with a known "watchdog" function in which the health of processor 74 and vehicle network interface 72 is determined by periodic signals sent to or from logic failure detector 100. If logic failure detector 100 detects a failure, signal 102 and 104 may force power control devices 78 into a predetermined state to provide some level of driver safety during the failure condition. For example, if either vehicle network interface 72 or processor 74 fails, logic failure detector 100 may turn on the trailer running lights and may turn off other lights, such as an interior dome light of the trailer. Therefore, some functions are turned on for safety, while other functions may be turned off because they are deemed not needed in the failure mode, or they may be turned off to prolong remaining battery life.

Voltage sensor 106 may be coupled to power bus 80 to detect the voltage of vehicle battery 62. Voltage sensor 106 is coupled to processor 74 for reporting the battery voltage. Processor 74 may use the battery voltage to determine that the battery voltage has fallen below a threshold and that battery power should be conserved by shedding power loads of the trailer so that the vehicle may reserve enough power to start the vehicle rather than running the battery completely down to a point that the vehicle can not be started. Note that voltage sensor 106 may also be incorporated within processor 74 if processor 74 is able to receive analog voltages and perform A-to-D conversations.

Figure 5:
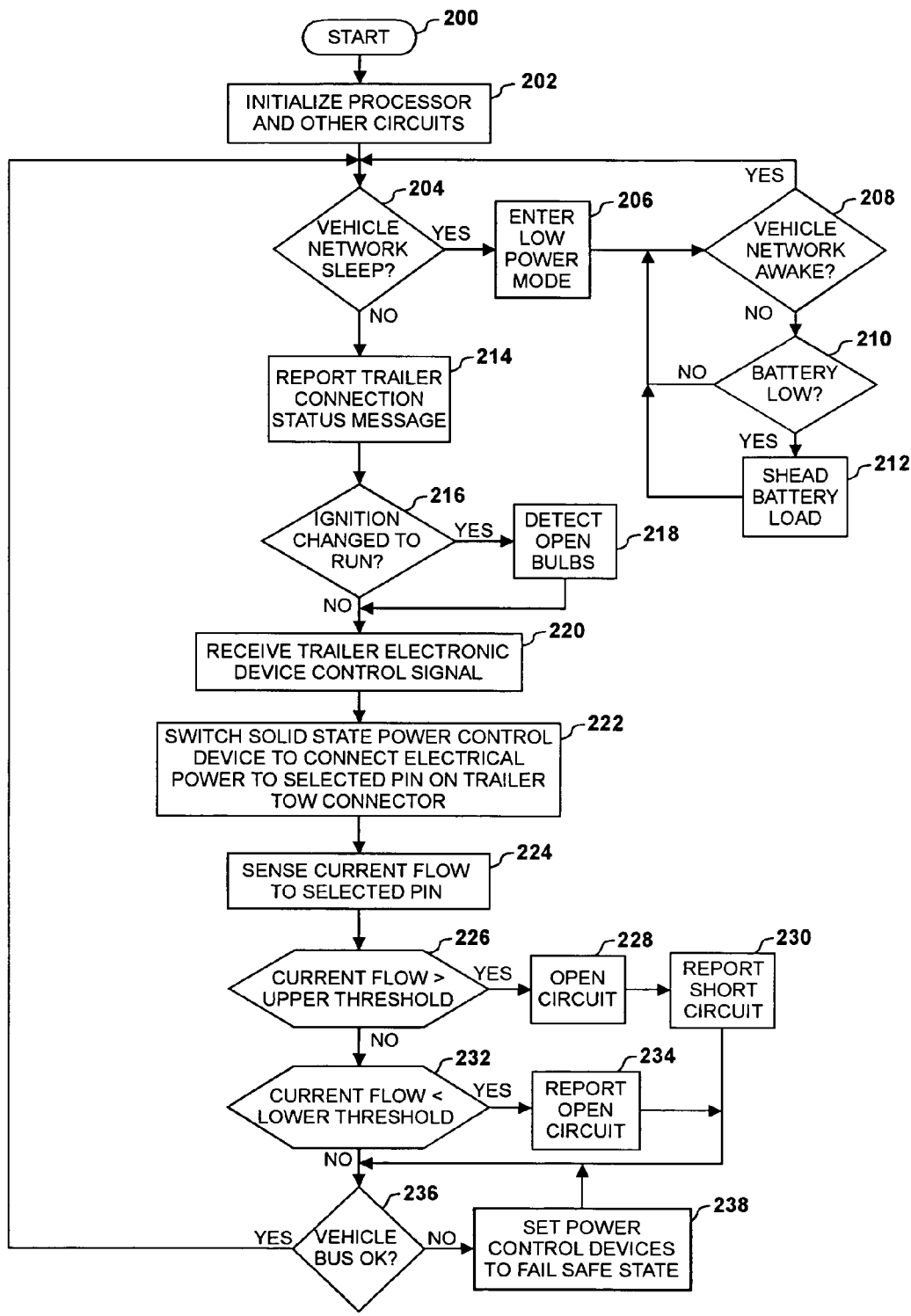
FIG. 5 is a high-level logic flowchart that illustrates the operation of the method and apparatus of the trailer tow connector module of the present invention.

With reference now to FIG. 5, there is depicted a high-level logic flowchart for the method and operation of the trailer tow connector module of the present invention. As illustrated, the process begins at block 200, and thereafter passes to block 202 wherein the internal processor and other circuits are initialized. As an example, power control devices 78 (See FIG. 4) may be turned off initially, and vehicle network interface 72 may be loaded with start up parameters, and then begin monitoring for communication activity on data communication bus 68. Initialization parameters that may have been stored in memory 76 may be recalled by processor 74 and used to set up various circuits as part of the initialization step. Additionally, processor 74 may perform some built in test in order to verify the operation of various portions of the circuit.

After initialization, the process determines whether or not the vehicle communication network is in a "sleep" state, as illustrated at block 204. If the process determines that the vehicle network is asleep, the process enters a low power mode, as depicted at block 206. In the low power mode, many of the circuits within trailer tow connector module 32 are turned off, or put into a sleep or dormant state that uses a minimal level of power.

Even when the vehicle ignition is turned off, trailer tow connector module 32 must be ready to wake up and receive commands for turning on brake lights or flashers.

After entering the sleep mode, the process determines whether or not the vehicle network has changed to an "awake" state, as illustrated at block 208. If the vehicle network is awake, the process returns to block 204, as illustrated by the yes branch from block 208. If the vehicle network remains in the sleep state, the process periodically determines whether or not the battery voltage has fallen below a threshold that indicates a low battery condition, as depicted at block 210. If the battery is not in a low condition, the process returns to block 208, as illustrated by the no branch from block 210.

If the process determines that the battery is low, which may indicate that the battery is approaching a state of discharge that will not start the vehicle, the battery begins to shed battery loads, as illustrated at block 212. In this load shedding mode, the process turns off loads that have been predetermined as unnecessary during a low battery condition. For example, if the vehicle was parked, and a dome light was left on inside the trailer, when the battery reaches a low condition the load shedding step may remove power from the pin that supplies power to the dome light in order to preserve enough energy in the battery to restart the vehicle.

Returning to block 204, if the process determines that the vehicle network is not asleep, the process reports a trailer connection status message, as depicted at block 214. This trailer connection status message indicates to modules monitoring vehicle data communication bus 68 whether or not a trailer is presently being towed behind the vehicle. Various modules in the vehicle may adjust their operation depending upon whether or not a trailer is present. For example, the vehicle transmission may adjust shift points to provide additional towing power. An antilock braking system may apply the brakes in a different way in an emergency depending upon whether or not a trailer is present. If a trailer is present, a warning system indicating objects are close to the rear bumper may be disabled to avoid constantly detecting and warning of the close proximity of the trailer.

It should be understood that messages may be broadcast via data communication bus 68 and various modules connected to the bus may determine whether or not a particular message is important to that module. As mentioned above, vehicle network interface 72 may broadcast status messages to data communication bus 68, and vehicle network interface 72 may receive messages broadcast by other modules within the vehicle and pass selected relevant messages to processor 74 for further processing and configuration of trailer tow connector module 32.

Next, after reporting the presence/absence of the trailer, the process determines whether or not the ignition state has recently changed to the run state, as illustrated at block 216. If the ignition has changed to the run state, the process may take this opportunity to detect bulbs or trailer lights that have open filaments, are burned out, or are otherwise disabled, as depicted at block 218. This step may be implemented by applying a short pulse of power to each light and taking a quick current measurement to verify that the circuit responds in a way that indicates that the lights are working. This test may be short enough that the lights are not fully lit so the test may not be noticed by someone observing the trailer. Note that this lighting test step may be performed elsewhere in this flowchart, and need not be performed when the ignition changes state.

Next, the process monitors and receives trailer electronic device control signals from the vehicle data communication bus 68, as illustrated at block 220. In this step, vehicle network interface 72 receives and analyzes recent messages from data communication bus 68. If messages are addressed to the function of trailer tow connector module 32, the message is passed on to processor 74 in order to act upon the message. Vehicle network interface 72 may receive some message that are subsequently ignored because they are not relevant or applicable to functions within trailer tow connector module 32. Note that in alternate embodiments the vehicle data network may communicate data over the power line (using power line carrier data transmission), or it may communicate wirelessly using any one of several know wireless data communication techniques.

Trailer electronic device control signals may include instructions to turn on particular lights, such as right and left turn signals, brake lights, running lights, backup lights, and the like. Other trailer electronic device control signals may be addressed to other functions on the trailer such as trailer brakes, trailer cooling or refrigeration devices, controlling trailer suspension modes, activating a backup audio alert signal, or operating other similar devices or passing other similar messages.

Next, the process switches a solid state power control device to connect electrical power to a selected pin on the trailer tow connector, as depicted at block 222. This step may be implemented with power control devices 78 that preferably use MOSFETs [metal oxide semiconductor field-effect transistor] with a low on resistance to connect power from power bus 80 (which is connected to a power input pin on the power control device) to pins, such as pins 82 and 84 in trailer tow connector 26. Thus, messages received from vehicle data communication bus 68 may cause power to be connected to selected pins in order to operate electronic devices on the trailer. For example, if the brakes are applied in the vehicle, a data bus message may instruct trailer tow connector module 32 to apply power to pin 82 in connector 26 in order to light the brake lights on the trailer. Similarly, messages are used to operate the turn signals, clearance lights, and to any other trailer lights or electronic devices.

Next, the process senses the current flow to the selected pin in the trailer tow connector, as illustrated at block 224. Current sensing may be implemented in power control devices 78 by current sensors 86. Current sense signal 88 is output by power control device 78.

After sensing the current, the process determines whether or not the current flow is greater than an upper threshold for the selected pin, as depicted at block 226. If the current flow exceeds an upper threshold, the process will open the circuit, or turn off the circuit, to avoid damaging wiring or other components in either the vehicle or the trailer, as illustrated at block 228. After opening the circuit, the process then reports a short circuit condition, or an over current condition, on data communication bus 68, as depicted at block 230. An electronic module in the vehicle may receive the report and display a message to the driver prompting investigation and repair of the problem.

If the current does not exceed an upper threshold, the process determines whether or not the current flow falls below a lower threshold, as illustrated at block 232. If the current falls below a lower threshold, the process reports an open circuit status, or a low current status, as depicted at block 234. The low current condition may indicate a burned out or failed trailer light. Thus, in blocks 226 through 234, the process determines whether or not the current flowing in the selected pin falls within a predetermined window or range of current values. If the current is outside the range of acceptable values, the out of range condition is reported to the vehicle data bus.

After any current error conditions are reported, the process determines whether the vehicle data communication bus is okay or working properly, as illustrated at block 236. If the vehicle data communication bus is not operating properly, the process sets the power control devices to a fail safe state, as depicted at block 238. The fail safe state may include turning on running lights so that a trailer is visible at night on the road, even though in the fail safe state the trailer may not have brake lights or turn signals. Additionally, the fail safe state may turn power off to accessories that are deemed not safety related, such as an interior dome light in the trailer.

After entering the fail safe mode, the processor continually checks the vehicle data communication bus to determine if normal bus operation has returned. While the process is waiting for the data bus operation to return, the process may also check for a low battery condition and may shed unnecessary battery loads, as described above in relation to blocks 210 and 212. The fail safe mode may also be invoked if logic failure detector 100 determines that processor 74 is not operating properly.

The steps indicated in the flowchart of FIG. 5, and the order of the steps, is presented for illustrating and teaching the operating principles of the present invention. Persons skilled in the art should recognize that the order of the steps may be changed, steps may be omitted, and additional steps may be performed. An important aspect of the invention is the creation of an operational and intelligent module that is self-contained and located near the trailer hitch or towing connection with the vehicle, wherein the trailer tow connector module responds to instructions on a vehicle data communication bus and reports status related to the electrical connection to the trailer to other modules operating on the data communication bus. Additionally, it is an important part of the invention that there are built-in test functions and failure mode operating functions within the trailer tow connector module that operate even when the module is receiving power from the vehicle battery, but is not able to communicate via the data communication bus.

Power control device 78 may also include additional sense circuits that implement a fail-safe monitoring feature that also provides for fail-safe operation if processor 74 (or its supporting circuitry, such as voltage regulators and oscillator) becomes inoperable. The fail-safe operation will be maintained to provide the capability to set outputs to a predetermined state. The outputs will be held in these states until power is removed. The power control device will re-evaluate the fail-safe condition upon every power on cycle.

The method and apparatus of the present invention have the advantage of placing intelligent power control, testing, and power management in a small self-contained package that can be installed in place of the prior art trailer tow connector assembly. Additionally, the new trailer tow connector module is easily integrated into modern vehicle networks containing other intelligent modules, and it may be programmed to operate in a variety of different applications according to the specifications of different vehicle manufactures. Additionally, the new trailer tow connector module has protection mechanisms to avoid damage due to short circuits in trailer wiring, wherein power is removed when current exceeds predetermined limits. When power is intelligently monitored and controlled, the need for replacing fuses may be eliminated, and power may be restored automatically when the short circuits are repaired or removed. The trailer tow connector module of the present invention may also conserve battery power in situations where lights have been left on and the battery is in danger of loosing the capacity to restart the vehicle.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for monitoring and controlling electronic devices connected to a trailer tow connector of a vehicle adapted to tow a trailer, the trailer tow connector having a memory, comprising:

determining if a trailer is connected to the vehicle and providing a trailer connection status indicating if a trailer is connected to the vehicle or not;

switching one or more solid state power control devices to disconnect electrical power to one or more selected pins of the trailer tow connector in response to the trailer connection status indicating that a trailer is not connected to the vehicle;

adjusting shift points of the vehicle's transmission in response to the trailer connection status indicating that a trailer is not connected to the vehicle;

adjusting the vehicle's antilock braking system in response to the trailer connection status indicating that a trailer is not connected to the vehicle;

storing an upper and a lower current threshold in the memory, the upper and lower current thresholds being based on the trailer type and size;

measuring the current flowing in the one or more selected pins of the trailer tow connector;

comparing the measured current to the upper and lower current thresholds;

switching the solid state power control device to disconnect the electrical power from the one or more selected pins of the trailer tow connector if the measured current exceeds the upper current threshold.

2. The method according to claim 1 further comprising:

measuring the vehicle's battery voltage;

reducing the load on the battery by removing power from the trailer's non-essential loads if the measured voltage is less than a lower voltage threshold.

3. The method according to claim 1 further comprising:

receiving a trailer electronic device control signal from a vehicle data communication network;

in response to the control signal, switching the one or more solid state power control devices to connect electrical power to selected pins of the trailer tow connector.

* * * * *